May 19, 1925.  1,538,011
H. ST. PIERRE
CONNECTING AND LOCKING DEVICE FOR TIRE CHAINS
Filed Aug. 14, 1924
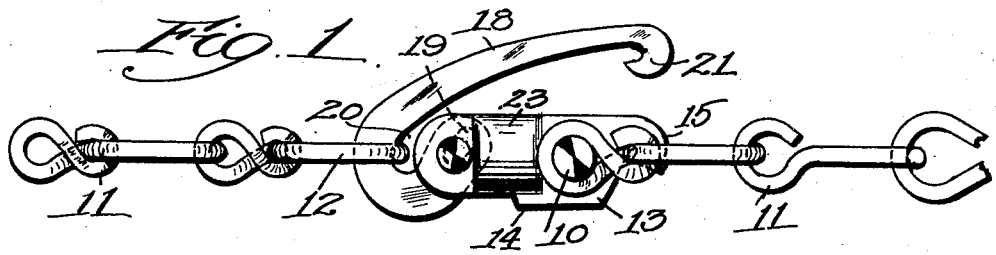
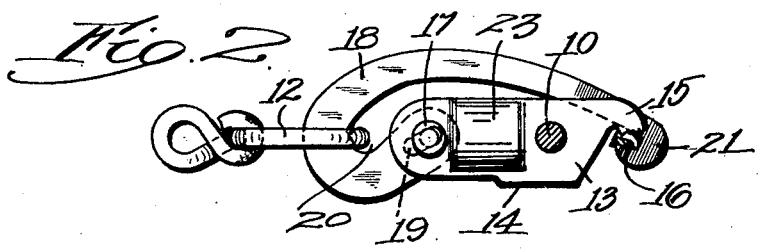
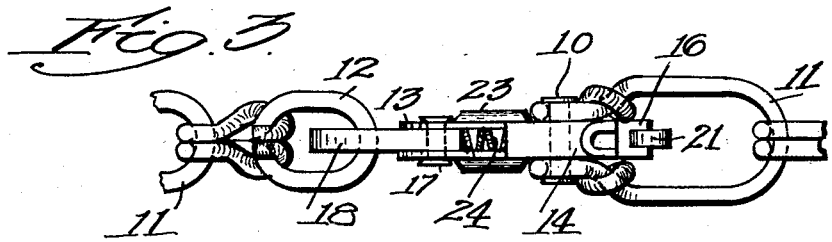
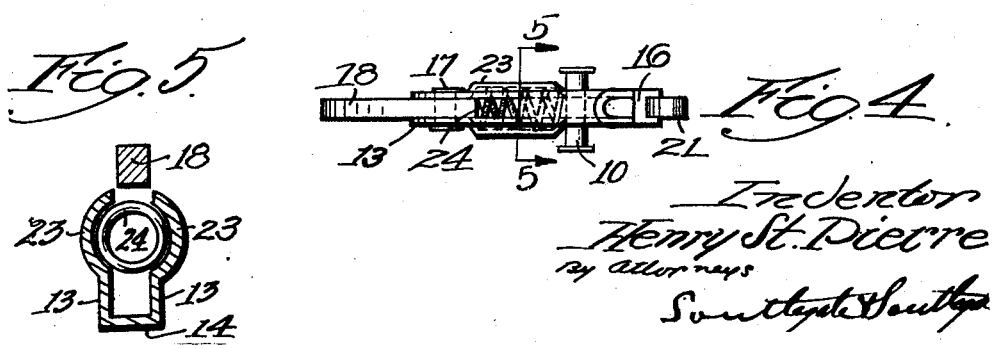
Inventor
Henry St. Pierre
by attorneys Patented May 19, 1925.

1,538,011

UNITED STATES PATENT OFFICE.

HENRY ST. PIERRE, OF WORCESTER, MASSACHUSETTS, ASSIGNOR TO ST. PIERRE CHAIN CORPORATION, OF WORCESTER, MASSACHUSETTS, A CORPORATION OF MASSACHUSETTS.

CONNECTING AND LOCKING DEVICE FOR TIRE CHAINS.

Application filed August 14, 1924. Serial No. 732,018.

*To all whom it may concern:*

Be it known that I, HENRY ST. PIERRE, a citizen of the United States, residing at Worcester, in the county of Worcester and State of Massachusetts, have invented a new and useful Connecting and Locking Device for Tire Chains, of which the following is a specification.

This invention relates to a device for connecting the ends of a tire chain and holding it on the tire.

The principal objects of the invention are to provide a construction which will be capable of being latched in a very easy and convenient manner and which will be held by the pull of the chain against unlatching accidentally and will also have other means for preventing its accidental unlatching and at the same time can be unlatched very conveniently without the exertion of any very great force while the chain is on and in a taut or even tight condition. It is also the object of the invention to provide these features in a simple and compact construction where the parts will not unduly project from the chain and will be inexpensive to manufacture and assemble.

Reference is to be had to the accompanying drawings, in which

Fig. 1 is a side view of a part of a tire chain with a preferred embodiment of this invention applied thereto as shown in unlatched position ready to be locked;

Fig. 2 is a similar view showing the parts in locked or latched position partly in section for that purpose.

Fig. 3 is a bottom plan of the same with the parts in the position shown in Fig. 2;

Fig. 4 is the same view of the latch by itself illustrating the spring holder therefor, and Fig. 5 is an enlarged transverse sectional view on the line 5—5 of Fig. 4.

This invention relates to that type of chain holding clamps or latches which connect the two ends of the chain by having a pivot pin 10 applied to one end of the chain 11 for receiving one part of the device and having a terminal eye 12 at the other end of the chain for connection with the other end of the latch. In this way the pin 10 passes through a casing 13 of sheet metal. This is doubled over on itself leaving a bottom wall 14 which is flat and two side walls which are duplicates of each other but, of course, in reverse position. Each of these side walls has an end 15 and one of them is bent over to form a transverse wall 16 extending across and connecting these two ends. This is located at an inclination with respect to a longitudinal line through the center of the device.

At the other end there is a cross pin 17 between the two side walls and located in fixed position. Mounted to swing about this pin 17 is a hook member or latch 18. The hook member is provided with a slot 19 for receiving the pin 17 and located at a slight inclination to the longitudinal line so as to lock the hook member 18 causing it to swing about the pivot pin but to slide longitudinally. This hook member 18 has a loop 20 for receiving the eye or terminal link 12 at one end located beyond the pin 17 and extending slightly below it or at least down to its level. The hook extends upwardly and forwardly from that point in a plane and terminates in a reverse bend 21 which constitutes a hook proper. It will be seen that the upper inner surface of the extremity of this hook 21 is located at an inclination similar to the inclination of the cross bar 16 and the two come into engagement with each other to lock the parts in position as shown in Fig. 2. At this point the hook 21 is located within the last link of the chain 11 on that end.

As soon as the parts are latched in this position it will be seen that pressure to the right on the hook member 18 will enable that hook to move to the right on account of the extent of the slot 19. When it is moved far enough to detach the hook end 21 from the cross bar 16 it can be opened as shown in Fig. 1. In order to lock it all that is necessary is to swing it down from the position shown in Fig. 1 and bring it forward and then let it swing back.

It will be noted that the two side walls of the frame 13 have convex enlargements 23. These constitute parts of a cylinder and are formed easily and inexpensively in the operation of producing the frame. They support in them a spring 24 which is shown in this case as a coil spring bearing on the end of the hook member 18 at one end and on the cross pin 10 at the other. Consequently, this spring constantly tends to force the hook over into locking position after it has been moved down far enough to lock. When unlocked it also tends to hold it in the open position shown in Fig. 1.

It will be seen that when the latch is in the unlocked position shown in Fig. 1 and the spring holds it in that position evenly, the chain is not yet disconnected but is held by the hook on account of the shape of the depression 20. If the operator wants to detach the chain he can do so by swinging the hook all the way around. If he merely wishes to loosen it for adjustment he could leave it in the position shown in Fig. 1 while he is moving the chain about to get it in the right position and he will not be in danger of the whole latch coming apart and dropping off. At the same time the locking of the device is a very simple matter and it will be held in locked position not only by its own shape and the pull of the chain but also by the spring. It is inexpensive and simple to make and these assembled latches contain no parts likely to get out of order or to mystify the ordinary user.

Although I have illustrated and described only a single form of the invention, I am aware of the fact that modifications can be made therein by any person skilled in the art without departing from the scope of the invention as expressed in the claims. Therefore, I do not wish to be limited in these respects, but what I do claim is—

1. As an article of manufacture, a locking device for a tire chain comprising a frame for connection with one end of the chain, a latch or hook member slidably pivoted thereon for receiving a link at the other end of the chain, and having a reverse bend at the opposite end to constitute a hook proper, the frame having a cross bar for receiving the end of the hook under it.

2. As an article of manufacture, a locking device comprising a frame, a latch slidably pivoted thereon for receiving an eye, said latch having a reverse bend at the end opposite to constitute a hook proper, the frame having a cross bar for receiving the end of the hook under it and yielding means inside of the frame for normally holding the hook in closed or locked position.

3. As an article of manufacture, a locking device for a tire chain comprising a frame adapted to be connected with one end of the chain, a hook member slidably pivoted thereon for receiving a link at the other end of the chain, said hook member having a hook proper at the opposite end, the frame having a cross bar for receiving the end of the hook under it, and a longitudinal coil spring inside the frame on the hook member for pushing the hook backward in position to hold it locked.

4. A tire chain latch comprising a frame having two parallel walls spaced apart, and a pair of cross pins fixed in said walls in combination with a chain having one end fixed to one cross pin and an eye at the other end, a hook member pivoted on the other cross pin and having a slot slightly inclined to the longitudinal for receiving it to permit the hook to move back and forth on the pin, said hook having a loop for receiving said eye and having a bar extending longitudinally along said frame and provided with a hook proper at the opposite end at an inclination, the frame having a cross bar at that end at the same inclination for receiving the hook.

5. The combination with a tire chain latch comprising a frame having two parallel walls spaced apart, and a pair of cross pins fixed in said walls, of a chain having one end fixed to one cross pin and an eye at the other, a hook member pivoted on the other cross pin and having means by which it can move back and forth on the pin, said hook having a loop for receiving said eye and having a bar extending longitudinally along said frame and provided with a hook proper at the opposite end at an inclination, the frame having a cross bar at that end at the same inclination for receiving the hook, whereby the pull of the chain will tend to keep the latch closed, and yielding means for assisting in holding it closed.

6. As an article of manufacture, a tire chain latch comprising a sheet metal frame formed from a piece of sheet metal and provided with two parallel walls each having opposite bends curved on the arc of a circle, a pair of pins extending through the two walls, a spring held in the curved portion extending longitudinally thereof and abutting against one of said pins, a hook member pivoted on the other pin and receiving the other end of the spring, said hook member having a loop for receiving the other end of the chain and a hook proper at the other end for engaging the frame and locking the device in position.

In testimony whereof I have hereunto affixed my signature.

HENRY ST. PIERRE.